US010582031B2

(12) United States Patent
Hu

(10) Patent No.: US 10,582,031 B2
(45) Date of Patent: Mar. 3, 2020

(54) ELECTRONIC DEVICE AND CONTROL METHOD THEREOF

(71) Applicant: GUANGDONG OPPO MOBILE TELECOMMUNICATIONS CORP., LTD., Dongguan, Guangdong (CN)

(72) Inventor: Jianghua Hu, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

(21) Appl. No.: 16/206,068

(22) Filed: Nov. 30, 2018

(65) Prior Publication Data

US 2019/0306292 A1 Oct. 3, 2019

(30) Foreign Application Priority Data

Mar. 30, 2018 (CN) .......................... 2018 1 0298360

(51) Int. Cl.
*H01Q 1/24* (2006.01)
*H04M 1/02* (2006.01)

(52) U.S. Cl.
CPC .......... *H04M 1/0235* (2013.01); *H01Q 1/244* (2013.01); *H04M 1/0264* (2013.01); *H04M 1/0266* (2013.01)

(58) Field of Classification Search
None
See application file for complete search history.

(56) References Cited

U.S. PATENT DOCUMENTS

| 6,219,527 | B1* | 4/2001 | Ogawa | H01Q 1/103 |
| | | | | 455/13.1 |
| 6,545,643 | B1* | 4/2003 | Sward | H01Q 1/10 |
| | | | | 343/702 |

(Continued)

FOREIGN PATENT DOCUMENTS

| CN | 1433202 A | 7/2003 |
| CN | 201830251 U | 5/2011 |

(Continued)

OTHER PUBLICATIONS

Written Opinion of the International Searching Authority and International Search Report issued in corresponding International application No. 2018115275, dated Feb. 1, 2019 (10 pages).

(Continued)

*Primary Examiner* — Tuan A Tran
(74) *Attorney, Agent, or Firm* — Ladas & Parry, LLP

(57) ABSTRACT

An electronic device is provided. The electronic device includes a first electronic component, a second electronic component, a holder, and an antenna assembly. The second electronic component is slidably coupled to the first electronic component. The holder is coupled to the second electronic component and inserted into the first electronic component. The antenna assembly includes a radio frequency (RF) module, an antenna radiator, and an RF cable. The RF module is disposed in the first electronic component. The antenna radiator is disposed in the second electronic component. An end of the RF cable is coupled to the antenna radiator and the holder, and another end of the RF cable is coupled to the radio frequency module. The RF cable is retracted and stretched when the holder is driven to slide by sliding the second electronic component. A control method of the electronic device is also provided.

20 Claims, 15 Drawing Sheets

(56) References Cited

U.S. PATENT DOCUMENTS

| | | | |
|---|---|---|---|
| 6,556,170 B2 | 4/2003 | Northey | |
| 6,859,179 B2* | 2/2005 | Chang | H01Q 1/088 |
| | | | 343/702 |
| 7,274,335 B2* | 9/2007 | Kim | H01Q 1/243 |
| | | | 343/700 MS |
| 7,639,187 B2* | 12/2009 | Caballero | H01Q 1/088 |
| | | | 343/702 |
| 7,656,355 B2* | 2/2010 | Hsin | H01Q 1/084 |
| | | | 343/702 |
| 8,554,293 B2* | 10/2013 | Lee | H01Q 1/50 |
| | | | 455/575.7 |
| 8,581,786 B2* | 11/2013 | Park | H01Q 1/50 |
| | | | 343/702 |
| 9,762,781 B2* | 9/2017 | Evans | H04N 5/2252 |
| 2008/0074329 A1 | 3/2008 | Caballero et al. | |
| 2011/0136551 A1* | 6/2011 | Wong | H01Q 1/243 |
| | | | 455/575.1 |
| 2012/0050115 A1 | 3/2012 | Kao | |
| 2014/0153211 A1 | 6/2014 | Malek et al. | |

FOREIGN PATENT DOCUMENTS

| | | |
|---|---|---|
| CN | 202488938 U | 10/2012 |
| CN | 105100451 A | 11/2015 |
| CN | 106774670 A | 5/2017 |
| CN | 206433032 U | 8/2017 |
| KR | 20050087489 A | 8/2005 |

OTHER PUBLICATIONS

Partial European Search Report issued in corresponding European application No. 18209189.2, dated Jun. 25, 2019 (13 pages).

* cited by examiner

ELECTRONIC DEVICE AND CONTROL METHOD THEREOF

CROSS-REFERENCE TO RELATED APPLICATION

This application claims priority to a Chinese application No. 201810298360.2 filed on Mar. 30, 2018, titled "ELECTRONIC DEVICE AND CONTROL METHOD THEREOF". The entirety of the above-mentioned application is hereby incorporated by reference herein.

TECHNICAL FIELD

The present disclosure relates to the field of consumer devices in general. More particularly, and without limitation, the disclosed embodiments relate to an electronic device and a control method thereof.

BACKGROUND

In a recent trend, an area of a display panel of an electronic device is progressively increased in size. Therefore, strong demand exists for upsizing of display panel, to respond to the trend.

Currently, an electronic device such as a mobile phone may have a housing and a display panel mounted on the housing, and a front camera disposed in the front of the housing. The front camera is adjacent to the display panel and may occupy a certain area of the front of the housing. Therefore a size of the display panel is limited. It is desirable to provide an electronic device that has a greater display size than in the past, and the front camera of the electronic device needs to be arranged in a desire manner.

SUMMARY

In accordance with an aspect, in one embodiment of the present disclosure, an electronic device is provided. The electronic device includes a first electronic component, a second electronic component, an antenna assembly, and a holder. The second electronic component is slidably coupled to the first electronic component. The antenna assembly includes a radio frequency (RF) module disposed in the first electronic component, an antenna radiator disposed in the second electronic component, and a RF cable disposed between and coupled to the radio frequency module and the antenna radiator. The radio frequency cable comprises a first segment and a second segment integrally extending from the first segment. The first segment is coupled to the antenna radiator. The second segment is coupled to the first segment and the radio frequency module. The holder is coupled to the second electronic component and slidably extending into the first electronic component by moving the second electronic component. The first segment is held by the holder, and the RF cable is driven to move by the holder.

In accordance with another aspect, in one embodiment of the present disclosure, a control method of an electronic device is provided. In the control method, a performance parameter of the antenna radiator is acquired. The second electronic component is driven to move away from the first electronic component until the second electronic component protrudes from the first electronic component if the performance parameter is smaller than a first predetermined threshold. The RF cable is driven to move by sliding the second electronic component, and the second segment is stretched.

In accordance with a still another aspect, in one embodiment of the present disclosure, an electronic device is provided. The electronic device includes a first electronic component, a second electronic component, a holder, and an antenna assembly. The second electronic component is slidably coupled to the first electronic component. The holder is coupled to the second electronic component and inserted into the first electronic component. The antenna assembly includes a radio frequency (RF) module, an antenna radiator, and an RF cable. The RF module is disposed in the first electronic component. The antenna radiator is disposed in the second electronic component. An end of the RF cable is coupled to the antenna radiator and held by the holder, and another end of the RF cable is coupled to the radio frequency module. The RF cable is retracted and stretched when the holder is driven to slide by sliding the second electronic component.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

Figure 1:
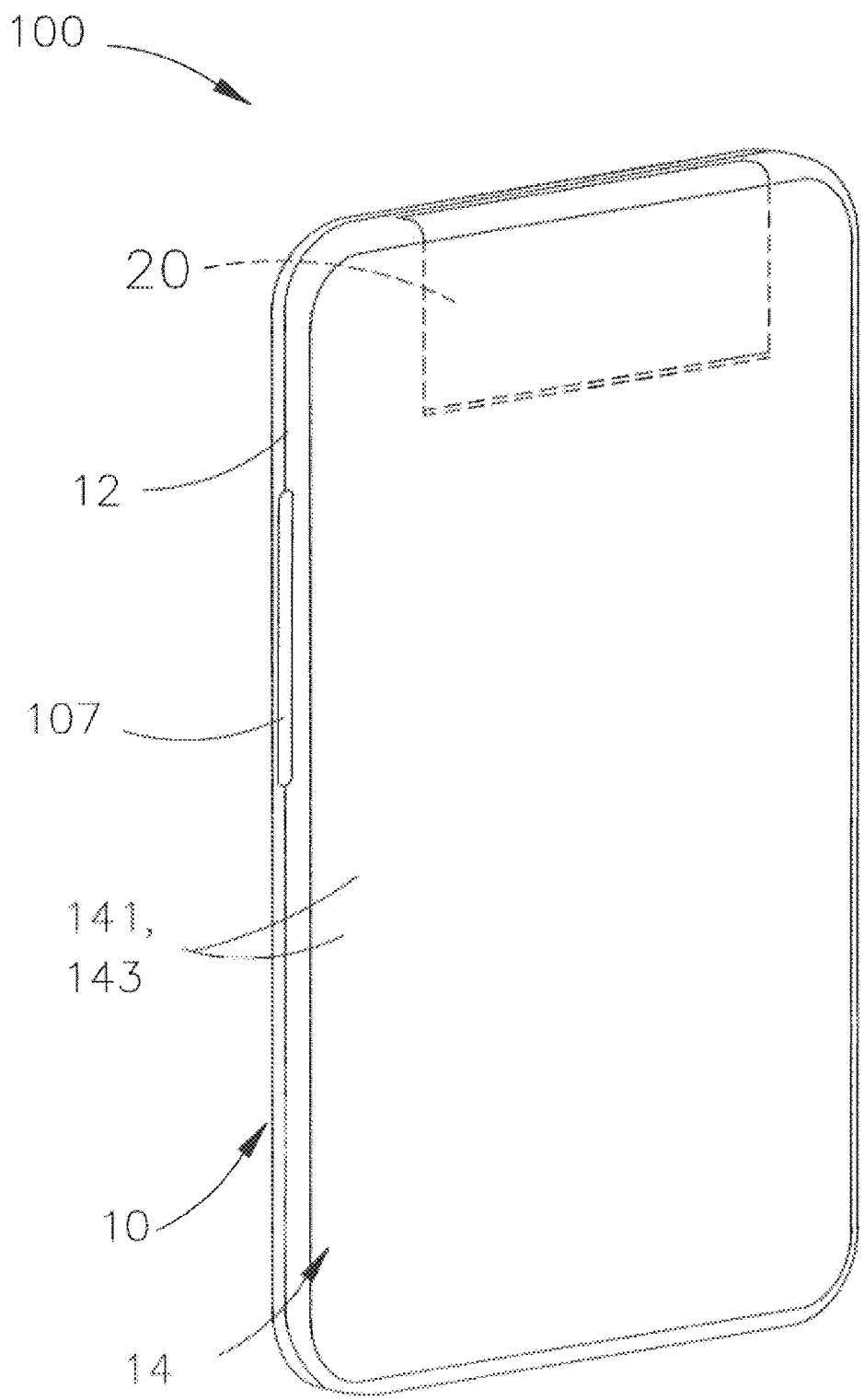
FIG. 1 illustrates a schematic perspective view of an electronic device in a first state, in accordance with an embodiment of the present disclosure.

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

As used herein, a "communication terminal", "electronic device" or simply a "terminal") includes, but is not limited to, a device that is configured to receive/transmit communication signals via a wire line connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. A communication terminal or an electronic device that is configured to communicate over a wireless interface may be referred to as a "wireless communication terminal," a "wireless terminal" and/or a "mobile terminal." Examples of mobile terminals and electronic devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

In accordance with an aspect, in one embodiment of the present disclosure, an electronic device is provided. The electronic device includes a first electronic component, a second electronic component, an antenna assembly, and a holder. The second electronic component is slidably coupled to the first electronic component. The antenna assembly includes a radio frequency (RF) module disposed in the first electronic component, an antenna radiator disposed in the second electronic component, and an RF cable disposed between and coupled to the radio frequency module and the antenna radiator. The radio frequency cable comprises a first segment and a second segment integrally extending from the first segment. The first segment is coupled to the antenna radiator The second segment is coupled to the first segment and the radio frequency module. The holder is coupled to the second electronic component and slidably extending into the first electronic component. The first segment is held by the holder. The RF cable is driven to move when the holder is driven to move by the second electronic component.

In accordance with another aspect, in one embodiment of the present disclosure, a control method of an electronic device is provided. In the control method, a performance parameter of the antenna radiator is acquired. The second electronic component is driven to move away from the first electronic component until the second electronic component protrudes from the first electronic component if the performance parameter is smaller than a first predetermined threshold. The RF cable is driven to move by sliding the second electronic component, and the second segment is stretched.

In accordance with a still another aspect, in one embodiment of the present disclosure, an electronic device is provided. The electronic device includes a first electronic component, a second electronic component, a holder, and an antenna assembly. The second electronic component is slidably coupled to the first electronic component. The holder is coupled to the second electronic component and inserted into the first electronic component. The antenna assembly includes a radio frequency (RF) module, an antenna radiator, and an RF cable. The RF module is disposed in the first electronic component. The antenna radiator is disposed in the second electronic component. An end of the RF cable is coupled to the antenna radiator and held by the holder, and another end of the RF cable is coupled to the radio frequency module. The RF cable is retracted and stretched when the holder is driven to slide by sliding the second electronic component.

As illustrated in FIG. 1, a mobile terminal 100 is provided, in accordance with an embodiment of the present disclosure. The mobile terminal 100 can be any device with communication function and storage function, such as: a tablet, a mobile phone, an e-reader, a remote control, a personal computer (PC), a notebook computer, car device, a network television, a wearable device smart, or other smart device with network capabilities. The electronic device 100 of the illustrated embodiment will be described by taking a mobile phone as an example.

The electronic device 100 includes a first electronic component 10, a second electronic component 20, and an electronic module 30. The second electronic component 20 is coupled to the first electronic component 10. The electronic module 30 is disposed in the first electronic component 10 and the second electronic component 20.

The first electronic component 10 includes a housing 12 and a display 14 disposed on the housing 12. In this embodiment, the display 14 includes a display panel 141, and may also include a circuit or the like for responding to a touch operation on the display panel 141. The display panel 141 may be a liquid crystal display (LCD). In some alternative embodiments, the display panel 141 may be a touch panel 143.

Figure 2:
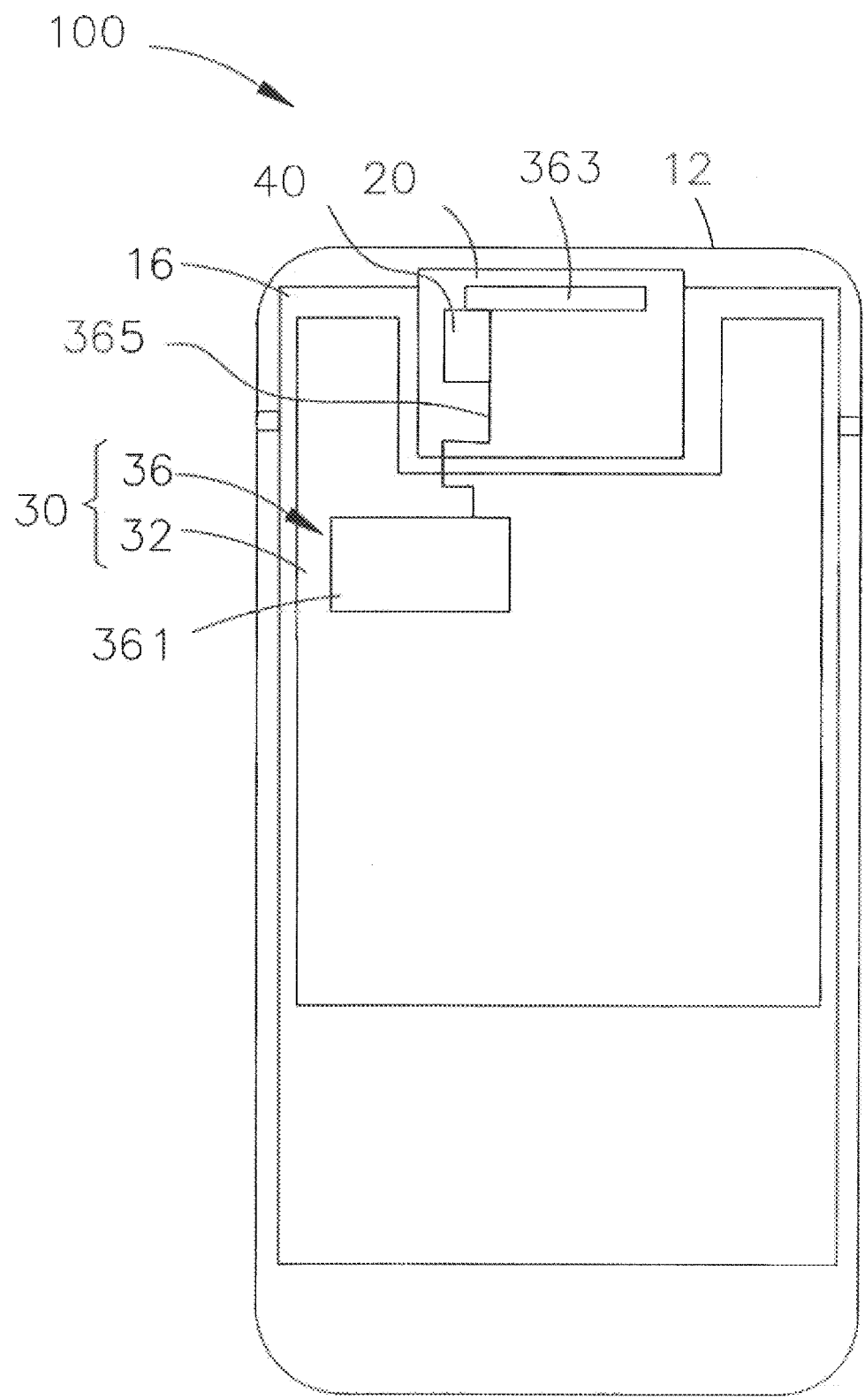
FIG. 2 illustrates a schematic view of an internal structural of the electronic device of FIG. 1.
Figure 4:
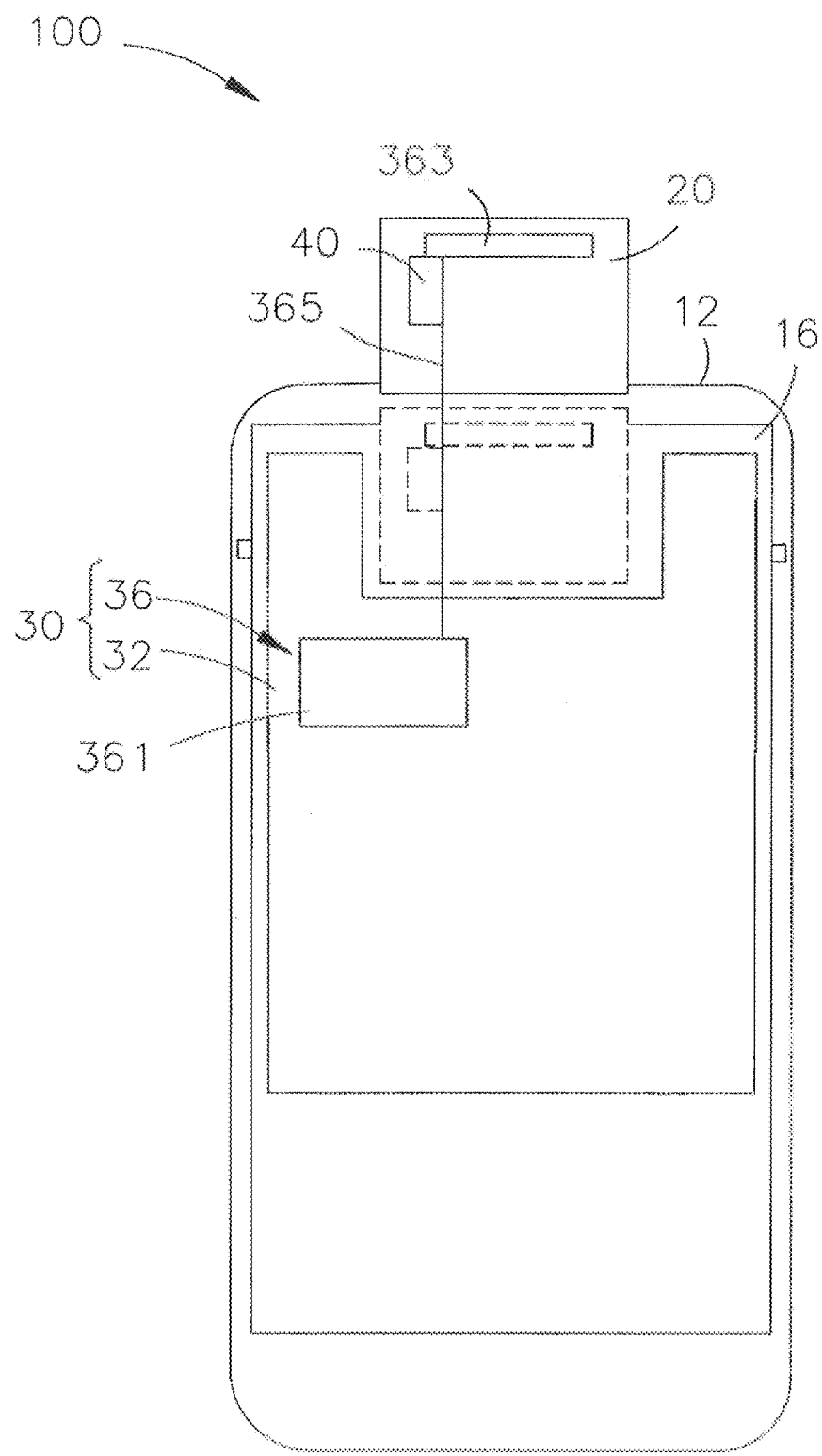
FIG. 4 illustrates a schematic view of an internal structural of the electronic device of FIG. 3.

As illustrated in FIG. 2 and FIG. 4, the first electronic component 10 further includes a mounting member 16. The mounting member 16 is disposed in the housing 12 and coupled to a frame of the electronic device 100 (not labeled). The mounting member 16 is configured to support the electronic module 30. In some embodiments, the mounting member 16 may have substantially a shape of a plate. The mounting member 16 may be made of metal, plastic, resin, or rubber.

The second electronic component 20 is slidably coupled to the first electronic component 10 and adjacent to the mounting member 16. In one embodiment, the second electronic component 20 is coupled to the first electronic component 10 via a flexible mechanism (not illustrated). In the embodiment illustrated in FIGS. 3 and 4, the second electronic component 20 is received in the housing 12. When in used, the second electronic component 20 is driven to move to the outside of the housing 12. Otherwise, the second electronic component 20 is received in the housing 12. Such that there is no need to define any hole or provide any support portion in the front of the housing 12 of the electronic device 100. A front surface of the housing 12 is maintained in a good overall shape, and the electronic device 100 is more beautiful. In addition, the second electronic component 20 can be outstretched with respect to the housing 12 instead of being directly disposed on the front surface of the housing 12. Therefore more installation space for the display panel 141 may be provided, and the electronic device 100 can achieve a large screen ratio for realizing a full-screen structure. In this embodiment, the second electronic component 20 may include one or more of the following modules: a receiver module, a camera module, a sensor module, a fingerprint module, a display module.

The electronic module 30 is coupled to the mounting member 16 and the second electronic component 20. In this embodiment, the electronic module 30 includes a board 32 and an antenna assembly 36. The board 32 may be a controller of the electronic device 100. The board 32 is fixed to the mounting member 16. The antenna assembly 36 is coupled to the board 32 and the second electronic component 20.

The antenna assembly 36 includes a radio frequency (RF) module 361, an antenna radiator 363, and an RF cable 365. In the illustrated embodiment, the RF module 361 is disposed on the board 32. The antenna radiator 363 is disposed in the second electronic component 20. The RF cable 365 is disposed between and electrically coupled to the RF module 361 and the antenna radiator 363. In order to ensure a connection structure of the antenna assembly 36, the RF cable 365 may have a sufficient length so that the RF cable 365 can be keep connecting with the antenna radiator 363 and the board 32 when the second electronic component 20 is stretched out of the housing 12.

Figure 5:
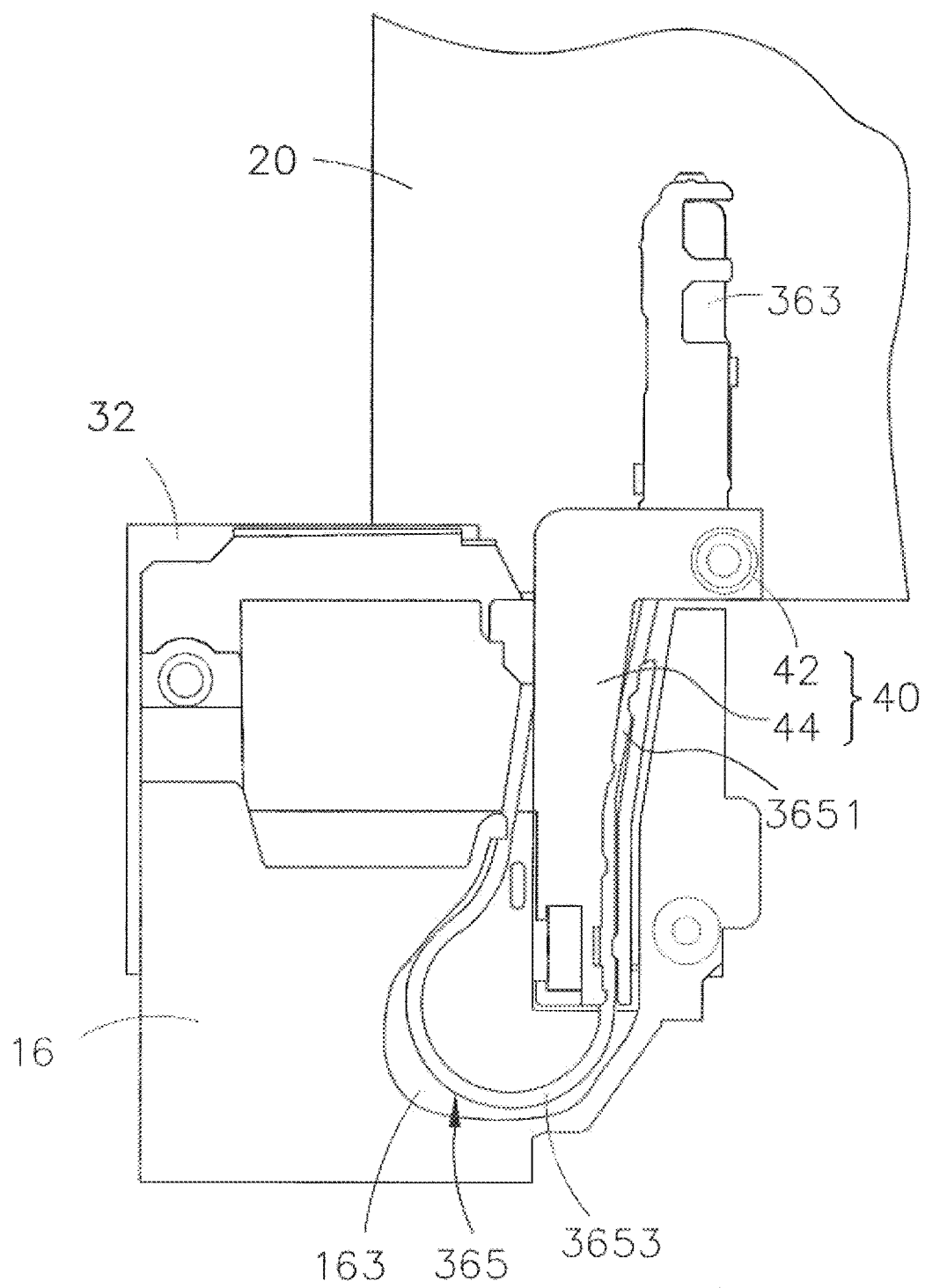
FIG. 5 illustrates a schematic projection view of an antenna assembly, a mounting member, and a holder of the electronic device of FIG. 1.

As illustrated in FIG. 5, furthermore, the electronic device 100 further includes a holder 40 coupled to the second electronic component 20. The holder 40 is configured to hold the RF cable 365, such that a portion of the RF cable 365 can be moved and follow the second electronic component 20. The RF cable 365 can be moved (i.e., outstretched or retracted) in a desire manner, therefore the RF cable 365 can be prevented from entanglement or bending damage when the second electronic component 20 is retracted inside the housing 12.

Figure 6:
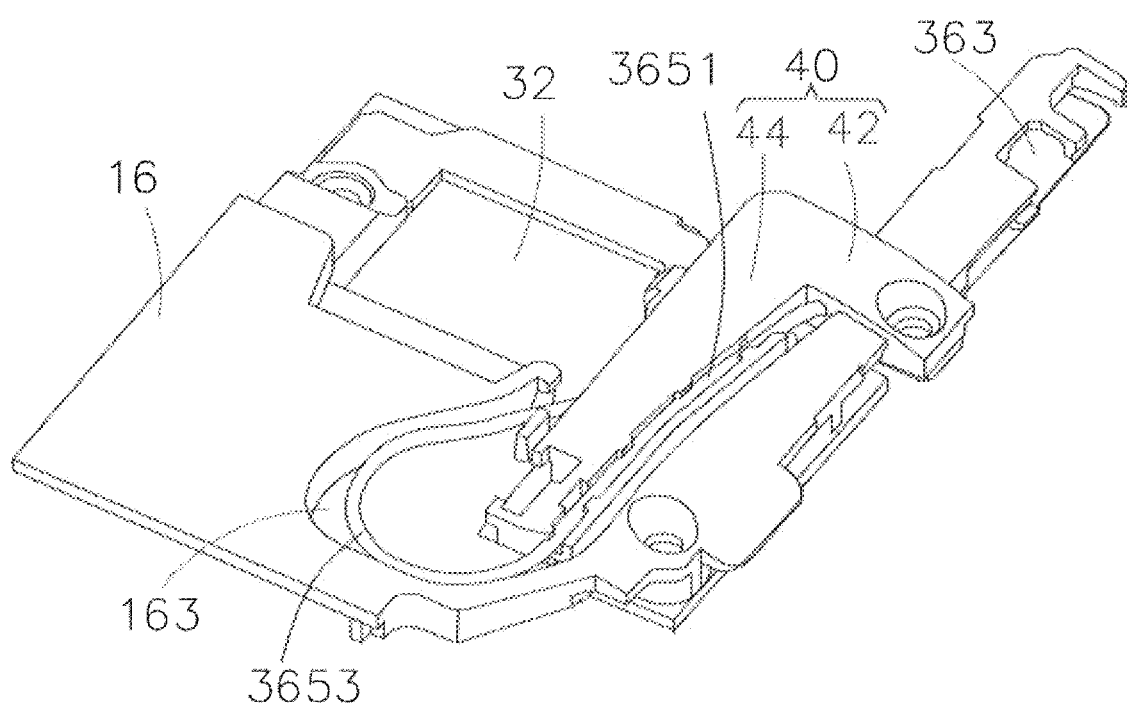
FIG. 6 illustrates a schematic perspective view of the antenna assembly, the mounting member, and the holder of FIG. 5.

As illustrated in FIG. 6, in the illustrated embodiment, the holder 40 includes a connecting portion 42 and a holding portion 44. The connecting portion 42 is coupled to the second electronic component 20 and is configured to support the antenna radiator 363. In other words, the antenna radiator 363 is coupled to the second electronic component 20 via the connecting portion 42. It should be understood that the antenna radiator 363 may be one of a plurality of antenna radiators of the electronic device 100, and other antenna radiators of the electronic device 100 may be disposed at other component of the electronic device 100 (i.e., disposed in the first electronic component 10). Alternatively, the antenna radiator 363 may also be an entire antenna radiator of the electronic device 100 that includes one or more antenna radiators. The holding portion 44 is disposed at an end of the connecting portion 42 adjacent to the first electronic component 10. The holding portion 44 can slidably extend into the first electronic component 10.

Figure 7:
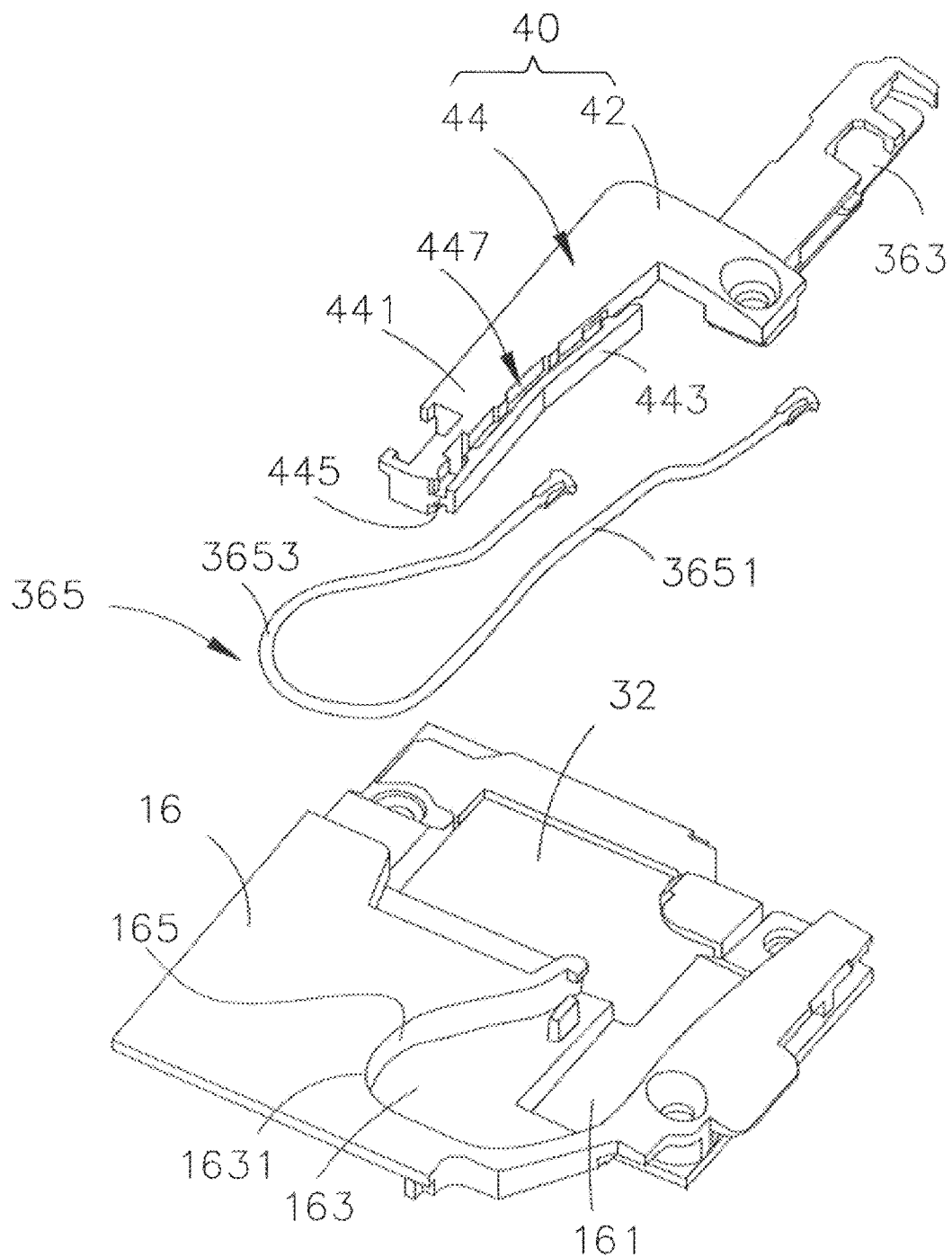
FIG. 7 illustrates a schematic exploded view of the antenna assembly, the mounting member, and the holder of FIG. 6.

As illustrated in FIG. 7, furthermore, the mounting member 16 defines a sliding groove 161 (illustrated in FIG. 7). The sliding groove 161 is configured to receive and position the holding portion 44. The holding portion 44 can be able to slide in the sliding groove 161. In the illustrated embodiment in FIG. 7, the sliding groove 161 is disposed on a side of the mounting member 16 adjacent to the second electronic component 20. And the sliding groove extends toward the second electronic component 20, and penetrates an edge of the mounting member 16. Such that the holding portion 44 can extend from the second electronic component 20 into the sliding groove 161.

Figure 8:
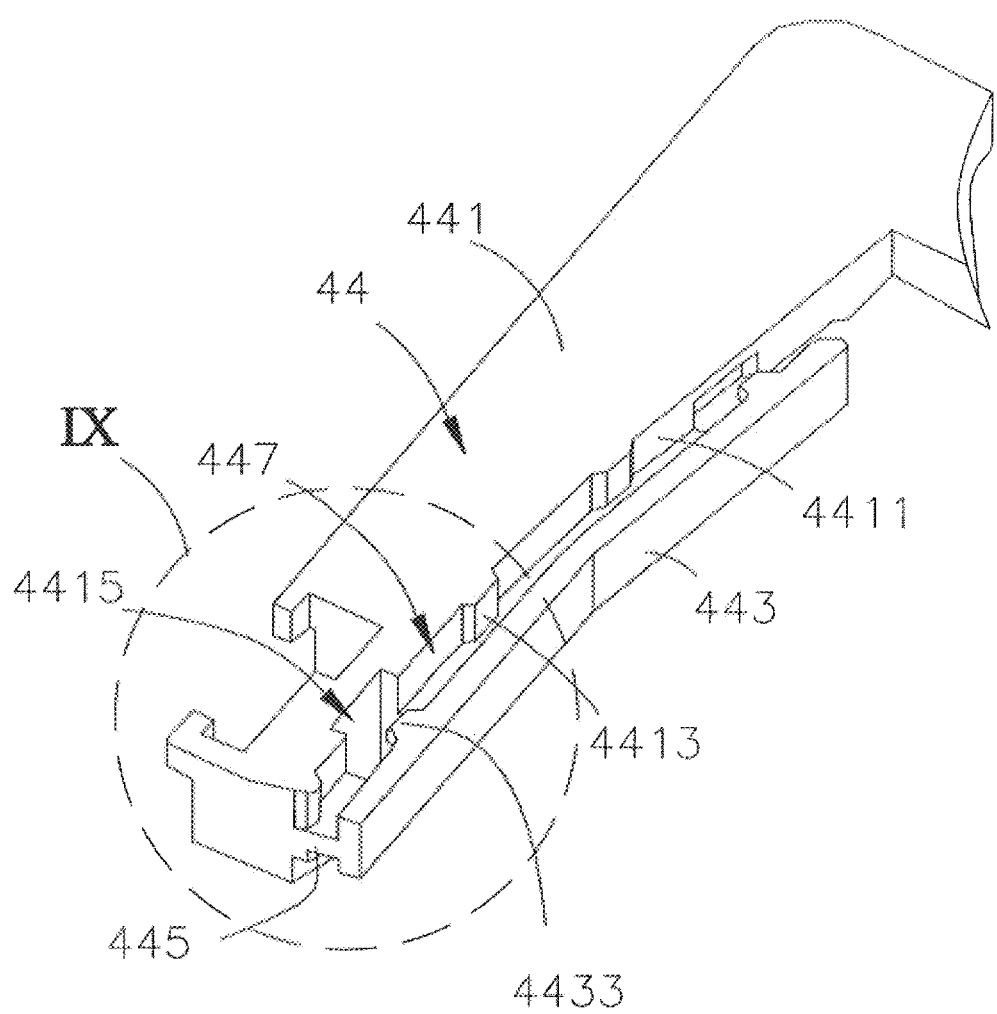
FIG. 8 illustrates a schematic perspective view of the holder of FIG. 7.
Figure 9:
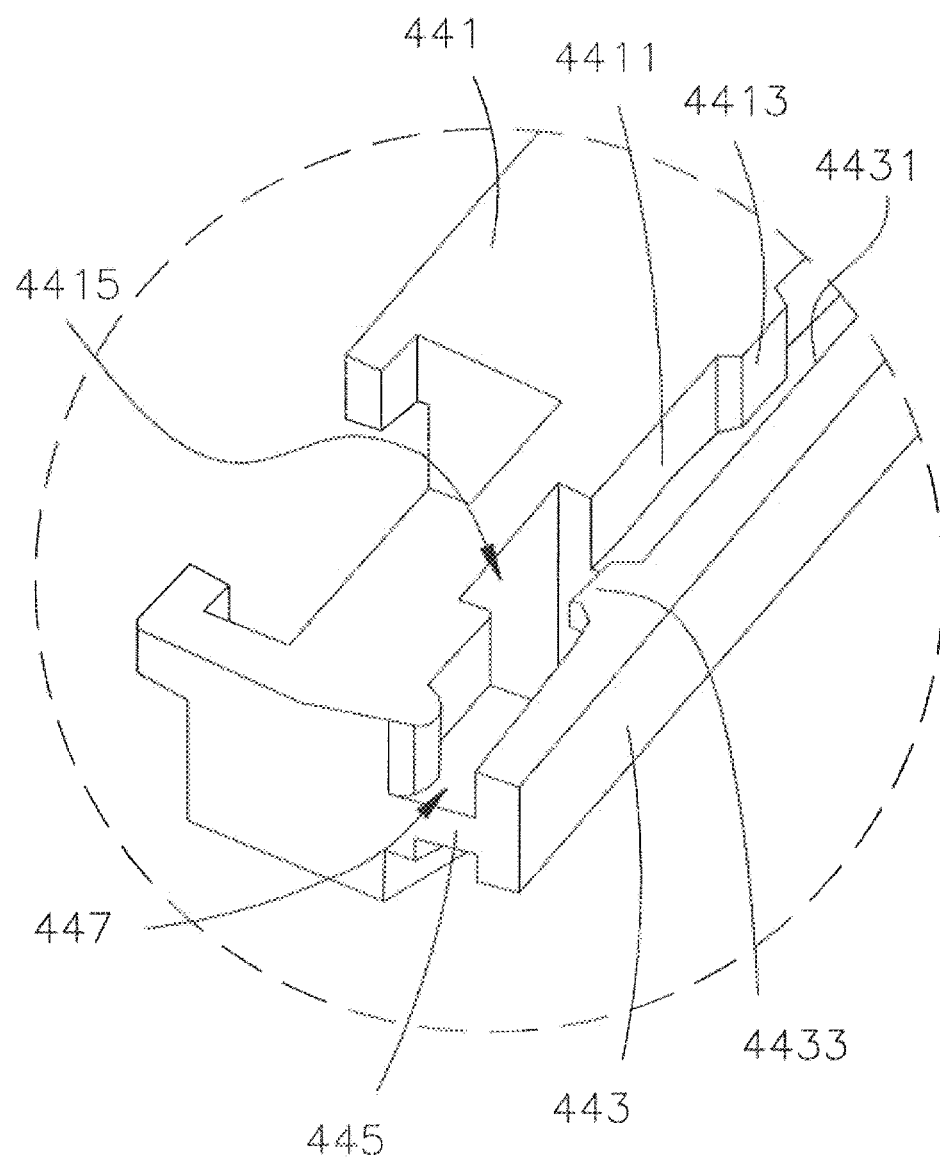
FIG. 9 illustrates an enlarged schematic view of an area IX of FIG. 8.

As illustrated in FIG. 8 and FIG. 9, in some alternative embodiments, the holding portion 44 includes a body portion 441, a block portion 443, and a supporting portion 445. The body portion 441 is disposed opposite to the block portion 443. The supporting portion 445 is disposed between the body portion 441 and the block portion 443. The body portion 441, the block portion 443, and the supporting portion 445 cooperatively define a holding groove 447. The holding groove 447 is configured to partially receive the RF cable 365.

Furthermore, the body portion 441 includes a first side wall 4411 facing the block portion 443 and a plurality of positioning protrusions 4413 formed on the first side wall 4411. Each of the positioning protrusions 4413 extends from the first side wall 4411 toward the block portion 443. The positioning protrusions 4413 are configured to hold the RF cable 365 cooperatively with the block portion 443.

Figure 10:
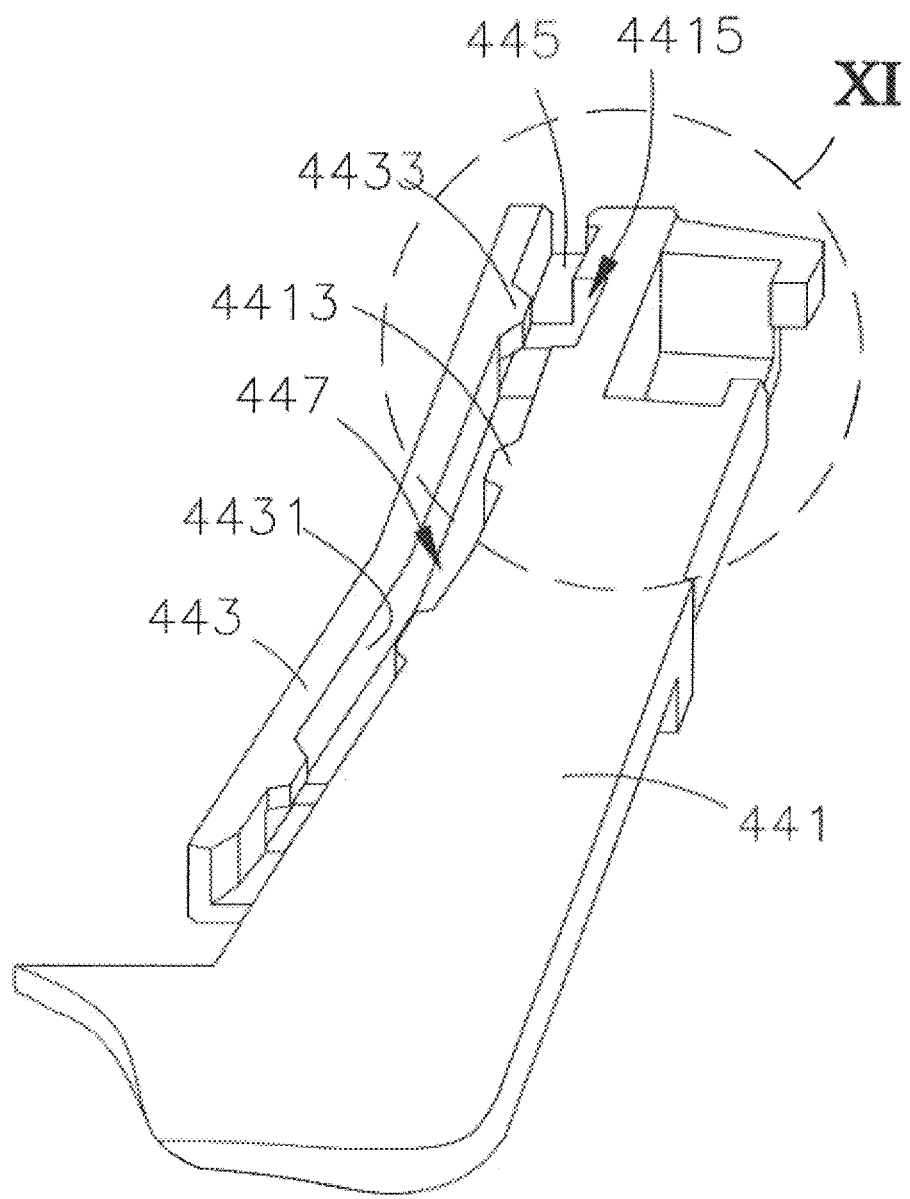
FIG. 10 illustrates a schematic perspective view of the holder of FIG. 8, taken from another perspective.
Figure 11:
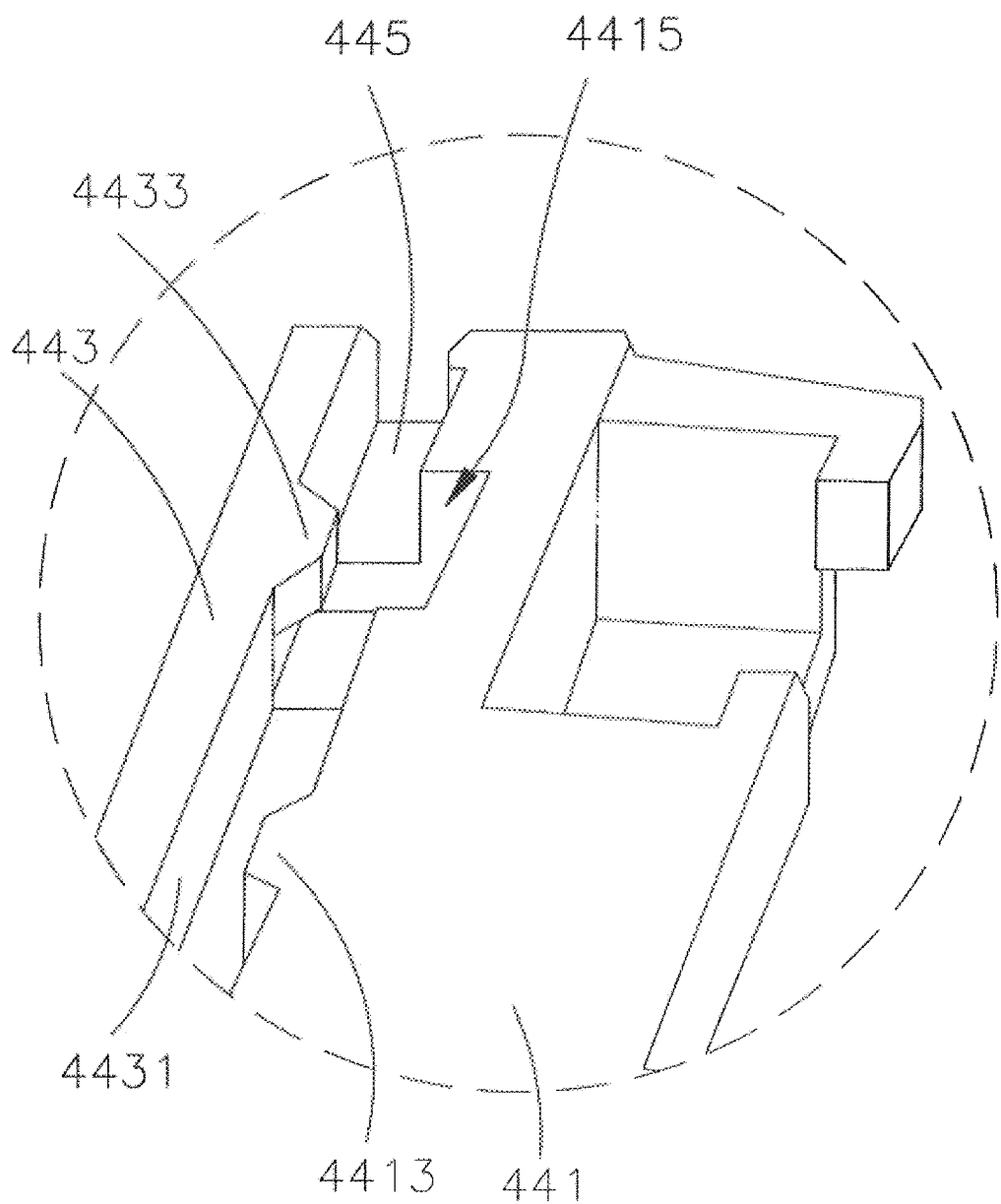
FIG. 11 illustrates an enlarged schematic view of an area XI of FIG. 10.

As illustrated in FIG. 10 and FIG. 11, in some alternative embodiments, the block portion 443 includes a second side wall 4431 facing the body portion 441 and a plurality of limiting protrusions 4433 formed on the second side wall 4431. Each of the limiting protrusions 4433 extends from the second side wall 4431 towards the body portion 441. The limiting protrusions 4433 are configured to keep the RF cable 365 being received in the holding groove 447, and prevent the RF cable 365 from coming out of the holding groove 447. Furthermore, the limiting protrusions 4433 are disposed on a side of the second side wall 4431 away from the supporting portion 445. And the limiting protrusions 4433 are spaced apart from the supporting portion 445, such that the limiting protrusions 4433 can cooperate with the supporting portion 445 to hold the RF cable 365. Furthermore, the first sidewall 4411 defines a plurality of indentations 4415 corresponding to the limiting protrusions 4433. Each of the indentations 4415 is a depression structure opposite to one corresponding limiting protrusion 4433. By providing the indentation 4415, the body portion 441 forms a avoiding structure corresponding to the limiting protrusion 4433 on the first side wall 4411, which facilitates to position the RF cable 365 in to the holding groove 447. And the RF cable 365 can be deformed in a shape according to a shape of the indentation 4415. Such that the RF cable 365 can be successfully mounted into the holding groove 447 and held between the limiting protrusion 4433 and the supporting portion 445. Therefore the RF cable 365 can be easily installed or removed.

As illustrated in FIG. 5, in the illustrated embodiment, an end of the RF cable 365 is coupled to the antenna radiator 363, and the other end is coupled to the RF module 361 (illustrated in FIG. 2).

The RF cable 365 includes a first segment 3651 and a second segment 3653. The first segment 3651 is coupled to the antenna radiator 363. The first segment 3651 is also held by the holder 40. An end of the first segment 3651 is coupled to the antenna radiator 363. The second segment 3653 is dispose between and coupled to the first segment 3651 and the RF module 361. The second segment 3653 is also movably received in the mounting member 16, and an end of the second segment 3653 is coupled to the RF module 361. Such that the second segment 3653 can be considered as a free portion that is free to deform (i.e., outstretch or retract) when the RF cable 365 retracts or stretches.

In some alternative embodiments, a length of the first segment 3651 is approximately ⅓ of that of the RF cable 365. In other words, approximately ⅓ of the RF cable 365 is fixed on the holder 40. Such that a portion (such as the first segment 3651) of the RF cable 365 can be moved in a desire manner by sliding the second electronic component 20. Another portion (such as the second segment 3653) of the RF cable 365 can be freely deformed, which can reduce a probability of the RF cable 365 itself being entangled. It can be understood that, in other alternative embodiments, the length of the first segment 3651 may be other values, for example, the length of the first segment 3651 may be approximately ¼, ½, etc., of that of the RE cable 365. Or a ratio of the length of the first segment 3651 to that of the RF cable 365 may be greater than or equal to ¼ and less than or equal to ¾. By this way, the RF cable 365 can be held by the holder 14 and can be moved in a desire manner. And the RE cable 365 can have a sufficient length to free to retract and stretch following the second electronic component 20.

Furthermore, in some alternative embodiments, the mounting member 16 further defines a depression 163. The depression 163 is configured to receive the second segment 3653, and define a movement space for the second segment 3653. The second segment 3653 is movably received in the depression 163 (as illustrated in FIG. 7).

In the embodiment illustrated in FIG. 7, the depression 163 is disposed at an end of the sliding groove 161 away from the second electronic component 20. And the depression 163 is offset to a center line of the sliding groove 161. In other words, the depression 163 is substantially adjacent to a corner of the sliding groove 161. The depression 163 communicates with the sliding groove 161. The depression 163 has a certain size to accommodate the second segment 3653 of the RF cable 365 which is bent when retracting.

In the illustrated embodiment, the mounting member 16 includes an interior wall 165. The interior wall 165 is surrounding and defines the depression 163. A contour 1631 of the depression 163 may be defined by the interior wall 165. The outline 1631 is curved for adapting to the second segment 3653 that in a bending state. The contour 1631 ensures that the second segment 3653 can have a sufficient space to retract and deformation.

In the illustrated embodiment, the contour 1631 of the depression 163 is substantially a curved structure which is similar to a curve of the RE cable 365 when retracted, and the contour 1631 extends in a direction away from the sliding groove 161. When the second electronic component 20 is driven to move toward the first electronic component 10, the RF cable 365 is driven to retract. Because the end of the second segment 3653 is fixed to the RF module 361, when the holder 40 slides in the sliding groove 161 toward the depression 163, the second segment 3653 is pushed by the first segment 3651, and the second segment 3653 is retracted and deformed in a direction away from the sliding groove 161 in the depression 163 so as to be received in the depression 163. Thus, when the second segment 3653 can be retracted in a desire manner, and damage or entanglement caused by irregular bending or movement of the RF cable 365 can be avoided.

Furthermore, in the illustrated embodiment, a depth of the depression 163 is less than a depth of the sliding groove 161. When the holder 40 is slidably received in the sliding groove 161, a surface of the supporting portion 445 facing the RF cable 365 and a bottom wall in the depression 163 is substantially coplanar. Such that the RF cable 365 can be support by the surface of the supporting portion 445 and the bottom wall in the depression 163. Therefore the RF cable 365 can be retracted and stretched smoothly.

In conclusion, the electronic device 100 provided according to the embodiment of the present disclosure has a second electronic component 20 that is stretchable and retractable with respect to the first electronic component 10. The antenna component 36 of the electronic device 100 extends from the second electronic component 20 to the first electronic component 10. A portion of the structure of the RF cable 365 is held by the holder 40, while another portion has a sufficient length to follow a movement of the second electronic component 20 to retract or stretch to free deformation in a desire manner. Therefore the RF cable 365 can be enabled to deformation following the movement of the second electronic component 20. This can avoid any entanglement or bending damage of the RF cable 365 during the process of retracting and stretching. Such that the electronic device 100 can achieve a larger screen ratio than in the past, and an connection quality of the antenna of the electronic device 100 can be ensure.

Figure 12:
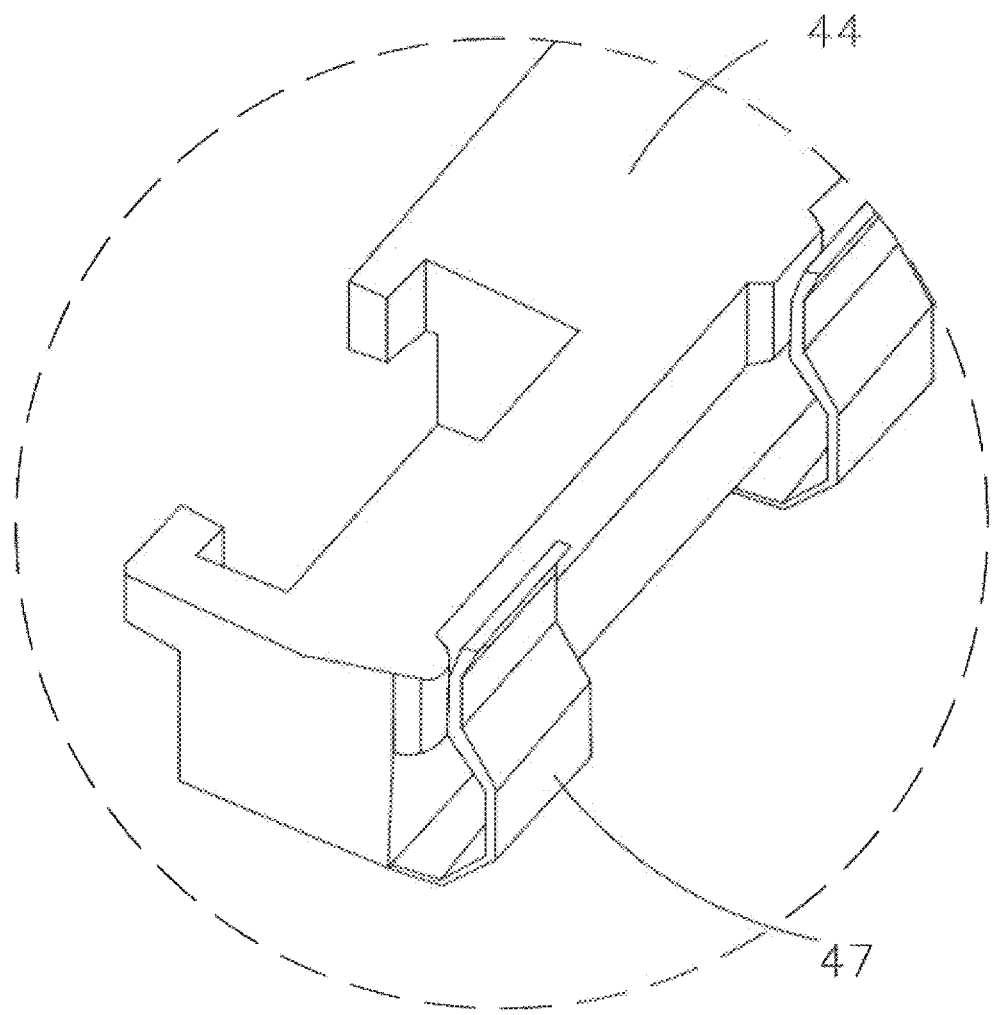
FIG. 12 illustrates a schematic view of a partial structure of a holder in accordance with another embodiment of the present disclosure.

In other alternative embodiments, the RF cable 365 can be held by other structure except for a structure of the holding member 440 mentioned above. For example, in an alternative embodiment, the positioning protrusions 4413, the limiting protrusions 4433, and the indentations 4415 can be omitted, and the block portion 443 can be elastic. Such that the block portion 443 can cooperate with the body portion 441 to fix the RF cable 365 to the holder 40. In further another alternative embodiment, as illustrated in FIG. 12, the holder 40 can further include an elastic arm 47 coupled to the holding portion 44. The elastic arm 47 cooperates with the holding portion 44 to fix the RF cable 365 to the holder 40. For further an example, in some alternative embodiments, the holder 40 can further include an elastic sleeve coupled to the holding portion 44, so that the RF wire 365 can be inserted through the elastic sleeve and can be held in the elastic sleeve.

Figure 13:
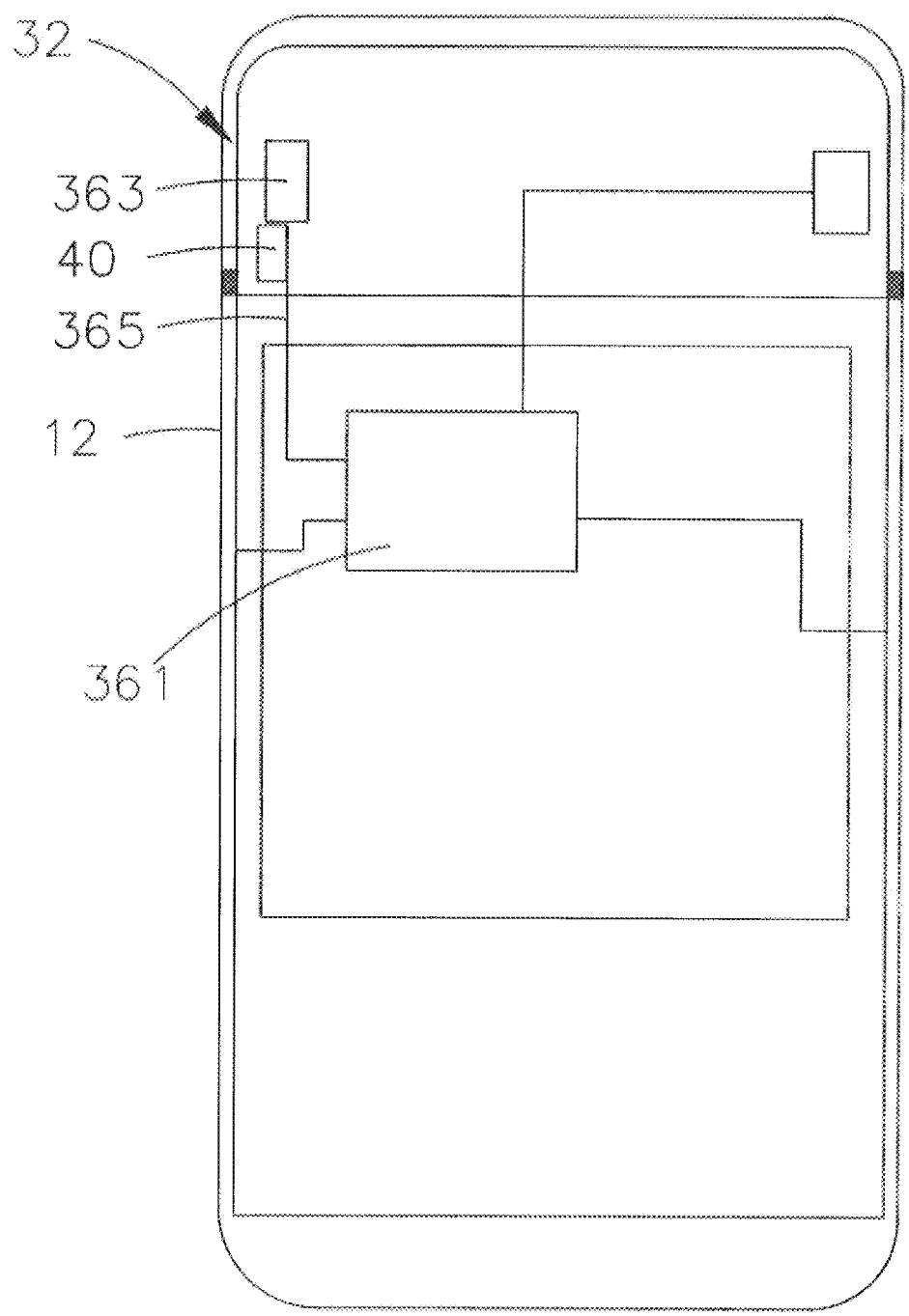
FIG. 13 illustrates a schematic view of an internal structural of an electronic device in accordance with another embodiment of the present disclosure.

In other alternative embodiments, a connection manner between the second electronic component 20 of the electronic device 100 and the first electronic component 10 is not limited to the above embodiment. For example, as illustrated in FIG. 13, in some embodiments, the second electronic component 20 is disposed adjacent to the first electronic component 10. The second electronic component 20 and the first electronic component 10 cooperatively from an appearance structure of the electronic device 100. By this way, the second electronic component 20 can be a display module, which is a secondary display of the electronic device 100, and can be configured to splicing with a display (i.e., the display 14) on the first electronic component 10. A display area of the electronic device 100 can be therefore enlarged than in the past. The second electronic component 20 can be moved far from or close to the housing 12.

Figure 14:
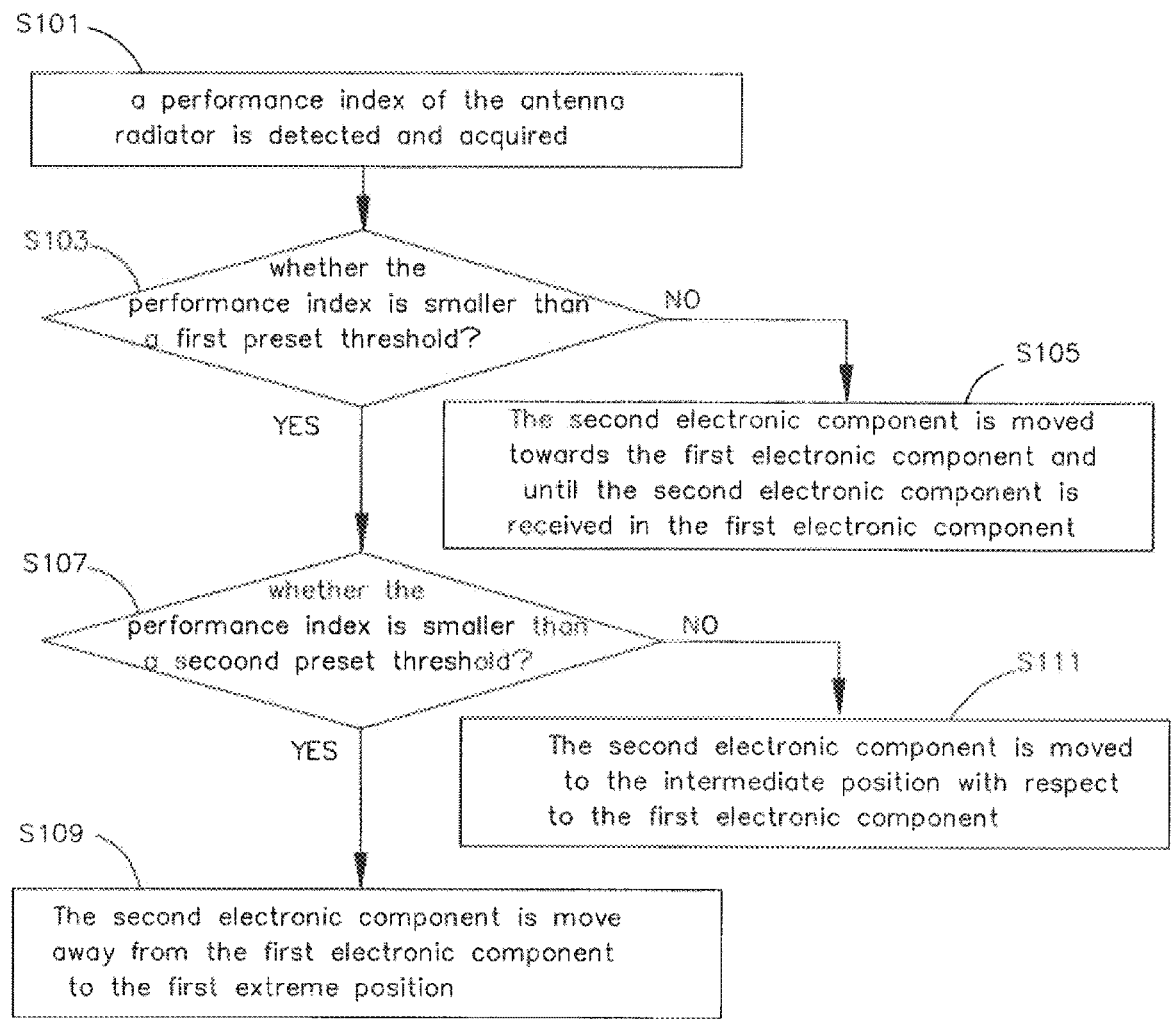
FIG. 14 illustrates a schematic flowchart of a control method for an electronic device, in accordance with further another embodiment of the present disclosure.

As illustrated in FIG. 14, a control method for an electronic device is provided in accordance with another embodiment of the present disclosure. The control method is applied to the electronic device described above. In the control method, a radiation intensity of the antenna radiator is acquired and a distance between the antenna radiator and a board of the electronic device is adjusted to improve an antenna radiation efficiency of the electronic device.

In some embodiments, the electronic device includes a first electronic component, a second electronic component, and an electronic module. The second electronic component is slidably coupled to the first electronic component. The second electronic component can be moved to slide with respect to the first electronic component. Such that second electronic component can be received in the first electronic component or moved away from the first electronic component. The electronic module includes a board and an antenna assembly. The board is disposed in the first electronic component, which may be a controller of the electronic device. The antenna component includes a radio frequency (RF) module, an antenna radiator, and a radio frequency (RF) cable. The radio frequency module is disposed on the board. The antenna radiator is disposed in the second electronic component. The radio frequency cable is electrically disposed between and coupled to the radio frequency module and the antenna radiator. When the second electronic component slides with respect to the first electronic component, the RF cable is driven to stretch or retract. The above control method according to the electronic device may include the blocks:

Block S101: a performance parameter of the antenna radiator is detected and acquired.

Furthermore, when the performance parameter of the antenna radiator is being detected, the performance parameter may include one or more of the following parameter indicators: a standing wave ratio, a radiation efficiency, a reflected power, and a return loss.

Block S103: It is determined whether the performance parameter is smaller than a first preset threshold, and if not, block S105 is performed; otherwise block S107 is performed.

Block S105: The second electronic component is driven to move towards the first electronic component and until the second electronic component is received in the first electronic component. When the second electronic component slides, the RF cable is driven to move, and a second, segment of the RF cable is retracted relative to a first segment of the RF cable.

Furthermore, in some alternative embodiments, before the second electronic component is driven to move, a position of the second electronic component relative to the first electronic component is acquired. Then the second electronic component is driven to move toward the first electronic component to be received in the first electronic component if the second electronic component is protruding from the first electronic component. Otherwise, the second electronic component is kept in a current position.

Figure 3:
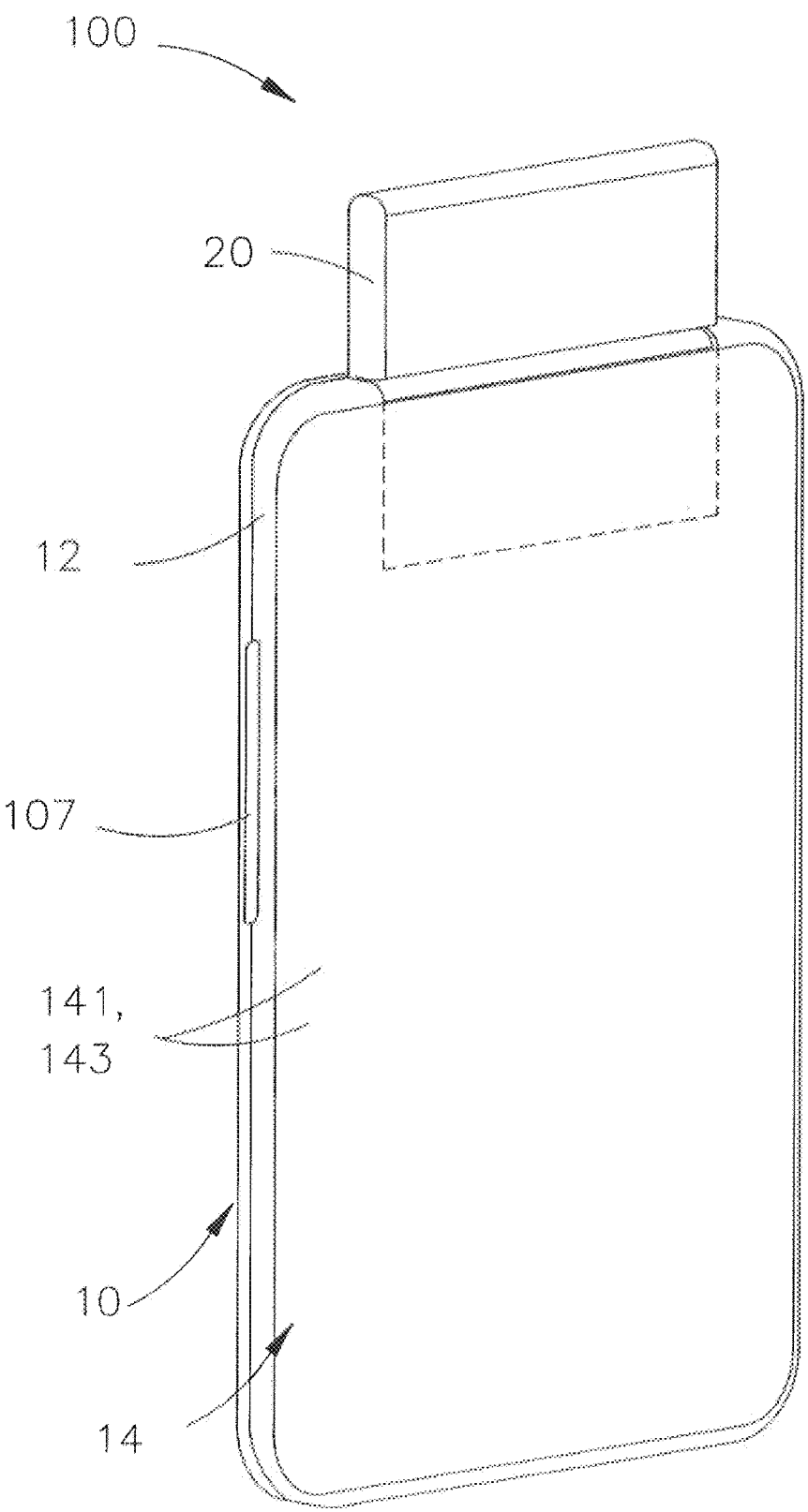
FIG. 3 illustrates a schematic perspective view of the electronic device in a second state of FIG. 1.

Furthermore, the position of the second electronic component relative to the first electronic component may include at least the following three cases:

a) The second electronic component is positioned at a first extreme position relative to the first electronic component. That is, the second electronic component is driven to move for an extreme distance away from the first electronic component to a position. In an embodiment, the first extreme position may be a position at which the second electronic component completely protrudes from the first electronic component (as illustrated in FIG. 3);

b) The second electronic component is positioned at a second extreme position relative to the first electronic component. That is, the second extreme position is a position at which the second electronic component is located after sliding for an extreme distance in a direction of approaching to the first electronic component. In an embodiment, the second extreme position may be a position at which the second electronic component is completely received in the first electronic component (as illustrated in FIG. 1);

c) The second electronic component is positioned at an intermediate position relative to the first electronic component. The intermediate position is between the first extreme position and the second extreme position. That is, the second electronic component is neither in the first extreme position nor in the second extreme positions.

Therefore, in block S105, the relative position of the second electronic component and the first electronic component is acquired. The second electronic component is driven to move to approach the first electronic component to the second extreme position if the second electronic component is not in the second extreme position. And the second electronic component is received in the first electronic component. Otherwise, the second electronic component is kept in the current position.

Block S107: It is determined whether the performance parameter is smaller than a second preset threshold. If yes, block S109 is performed, and otherwise, block S111 is performed. Furthermore, the second preset threshold is smaller than the first preset threshold.

Block S109: The second electronic component is move to slide away from the first electronic component to the first extreme position. The second electronic component slides to drive the RF cable. The second segment of the RF cable is driven to extend relative to the first segment of the RF cable.

Furthermore, in some alternative embodiments, before the second electronic component slides, a relative position between the second electronic component and the first electronic component is acquired. The second electronic component is driven to move and slide away from the first electronic component until the second electronic component reaches the first extreme position if the second electronic component is not in the first extreme position. Otherwise, the second electronic component is kept in the current position.

Block S111: The second electronic component is driven to move to the intermediate position with respect to the first electronic component.

Furthermore, in some embodiments, before the second electronic component slides, a relative position between the second electronic component and the first electronic component. The second electronic component is driven to move to the intermediate position if the second electronic component is not in the intermediate position. Otherwise, the second electronic component is kept in the current position. Furthermore, when the second electronic component slides, the RF cable is driven to move, and the second segment is retracted relative to the first segment or stretched relative to the first segment.

In the above control method of the electronic device, when the performance parameter of the antenna radiator is being detected, the detection may be performed in real time. And the relative position between the first electronic component and the second electronic device is adjusted according to a detection result. Therefore a distance between the antenna radiator and the board of the electronic device can be adjusted according to the detection result, which can improve an antenna radiation efficiency of the electronic device.

Therefore, in the control method of the electronic device provided in accordance with the embodiments of the present disclosure, by positioning the antenna radiator onto the second electronic component that can be able to slide, and a position of the second electronic device is adjusted according to the performance parameter of the antenna radiator. Therefore a radiation space of the antenna radiator is enlarged; the antenna radiation efficiency of the electronic device can be improved.

Figure 15:
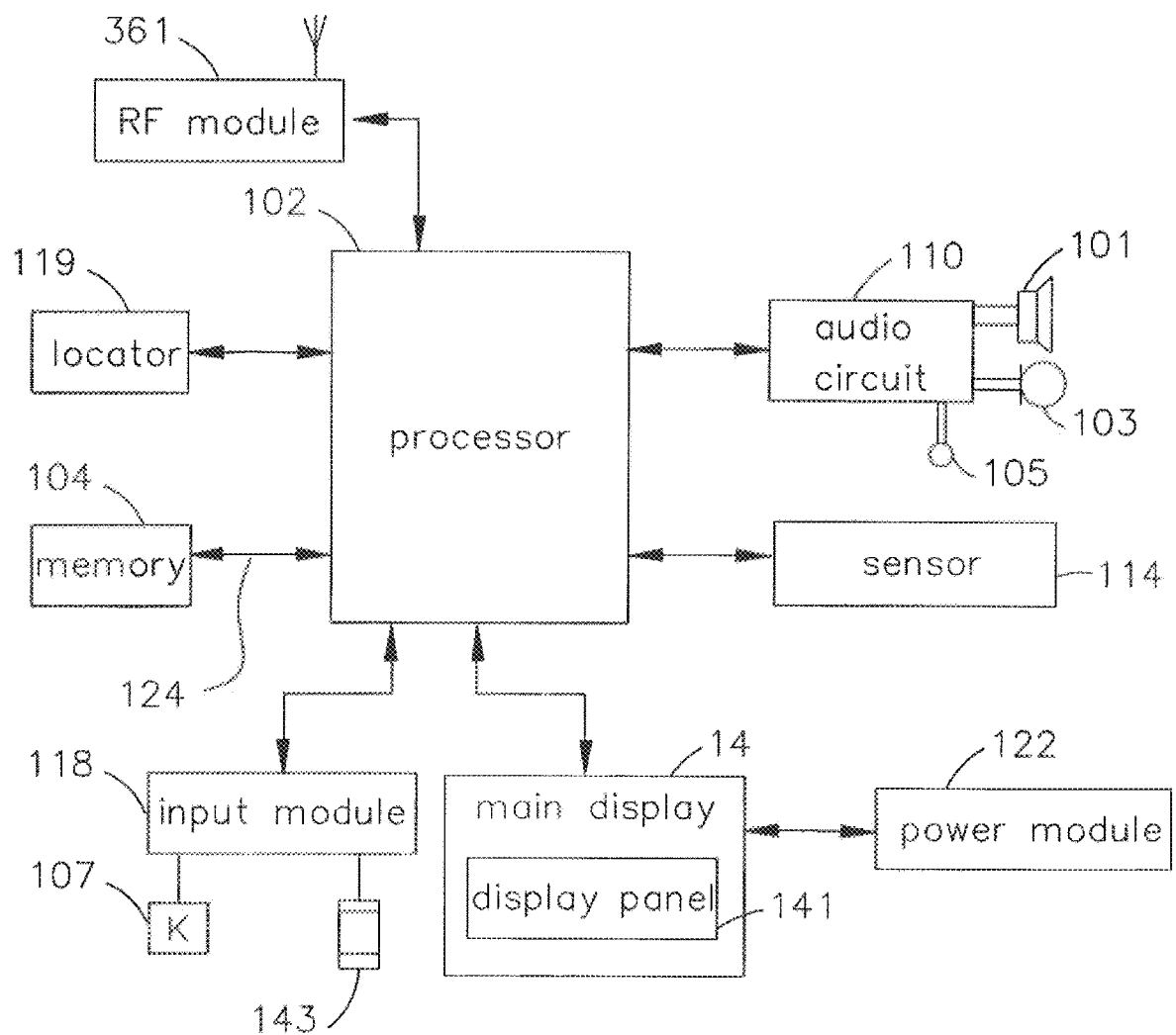
FIG. 15 illustrates a schematic view of a hardware environment of an electronic device, in accordance with an embodiment of the present disclosure.

As illustrated in FIG. 15, in an actual disclosure scenario, the electronic device 100 can be used as a smart phone terminal, in which case the electronic device 100 typically further includes one or more (only one illustrated in FIG. 15) processor 102, memory 104, the radio frequency (RF)

module 361, an audio circuit 110, a sensor 114, a input module 118, and a power module 122. It will be understood by those skilled in the art that the structure illustrated in FIG. 15 is merely illustrative and does not limit a structure of the electronic device 100. For example, the electronic device 100 may further include more or less components than those illustrated in FIG. 15, or have a different configuration than that illustrated in FIG. 15.

It will be understood by those skilled in the art that all other components are peripherals relative to the processor 102. The processor 102 is coupled to the peripherals via a plurality of peripheral interfaces 124.

The memory 104 can be configured to store software programs and modules. The processor 102 is configured to execute various functional disclosures and data processing by running software programs and modules stored in the memory 104.

The radio frequency module 361 is configured to receive and transmit electromagnetic waves, and realize mutual conversion between electromagnetic waves and electric signals. Therefore the electronic device 100 is capable of communicating with a network or other devices. The radio frequency module 361 can include various existing circuit components for performing these functions, such as an antenna, a radio frequency transceiver, a digital signal processor, an encryption/decryption chip, a Subscriber Identity Module (SIM) card, a memory, etc. The radio frequency module 361 can communicate with various networks such as the Internet, an intranet, a wireless network, or communicate with other devices through a wireless network.

The audio circuit 110, the speaker 101, the sound jack 103, and the microphone 105 collectively provide an audio interface on the first electronic component 10 or the display 14 for a user. The sensors 114 are disposed within housing 12 or within the display 14. Examples of the sensors 114 can include, but are not limited to, light sensors, operational sensors, pressure sensors, gravity acceleration sensors, and other sensors. In addition, the electronic device 100 can also be configured with other sensors such as a gyroscope, a barometer, a hygrometer, a thermometer, and the like, and details are not described herein again.

In this embodiment, the input module 118 may include a touch panel 143 disposed on the display module 14. The touch panel 143 is configured to detect a touch operation of the user and drive the corresponding connection device according to a preset program. In addition to touch panel 143, in other alternative embodiments, input module 118 may also include other input unit, such as button 107. The display module 14 is configured to display various graphical user interfaces for information input by the user and information provided to the user. These graphical user interfaces may be composed of graphics, text, icons, numbers, videos, and any combination thereof. In one example, the touch panel 143 can be disposed on the display panel 141 to be integrated with the display panel 141.

The power module 122 is configured to provide power to the processor 102 and other components. In the illustrated embodiment, the power module 122 may include a power management system, one or more power sources (such as a battery or an alternating current), a charging circuit, a power failure detecting circuit, an inverter, a power status indicator, and any other component which is configured with the first electronic component 10 or a component related to the generation, management, and distribution of power within the second electronic component.

The electronic device 100 can also include a locator 119 for determining the actual location at which the electronic device 100 is located. In this embodiment, the locator 119 applies a location service to implement the positioning of the electronic device 100. The positioning service should be understood as a technology or service of the location of the object being located, which is configured to acquire the location information (such as latitude and longitude coordinates) of the electronic device 100 by using a specific positioning technology, and marking the electronic map.

It should be understood that the electronic device 100 described above is not limited to a smartphone terminal, it should refer to a computer device that can be used in mobile. Specifically, the electronic device 100 refers to a mobile computer device equipped with a smart operating system, including but not limited to a smart phone, a smart watch, a notebook, a tablet computer, a POS machine, and even an in-vehicle computer, and the like.

Furthermore, as illustrated in some embodiments, the electronic device 100 may be a full-screen electronic device. The full-screen electronic device should be considered as an electronic device having a screen ratio greater than or equal to a preset value. That is, when the display module 14 is disposed on the front side of the housing 12, the percentage of the surface area of the display module 14 and the projected area of the front surface of the housing 12 is greater than or equal to a preset value. In some embodiments, the preset value of the screen ratio may be greater than or equal to 74%, such as 74%, 75%, 76%, 78%, 79%, 80%, 81%, 83%, 85%, 87%, 89%, 90%, 91%, 93%, 95%, 97%, 99%, etc. In some embodiments, a front side of the full-screen electronic device may be provided with three or fewer physical keys (such as button 107). And/or, the front side of the full-screen electronic device may be provided with two or fewer openings. Therefore a structure of the full-screen electronic device can be simplified; and it is beneficial to increase the screen ratio of the full-screen electronic device.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
   a first electronic component;
   a second electronic component slidably coupled to the first electronic component;
   an antenna assembly, comprising:
      a radio frequency (RF) module disposed in the first electronic component;
      an antenna radiator disposed in the second electronic component, and
      an RF cable disposed between and coupled to the radio frequency module and the antenna radiator; the radio frequency cable having a first segment and a second segment integrally extending from the first segment; the first segment being coupled to the antenna radiator; the second segment being coupled to the radio frequency module;
   a holder coupled to the second electronic component, the holder slidably extending into the first electronic component by moving the second electronic component; wherein the first segment is held by the holder, and the RF cable is driven to move by the holder; and a mounting member disposed in the first electronic component; the mounting member defines a depression and a sliding groove communicating with the depression; the holder is slidably extending into the sliding groove, and the second segment is movably disposed in the depression; the second segment is driven to move in the depression when the first segment moves.

2. The electronic device as claimed in claim 1, wherein the holder defines a holding groove; the first segment is disposed in the holding groove.

3. The electronic device as claimed in claim 2, wherein the holder comprises a body portion and a block portion, the body portion is spaced from the block portion; the holding groove is defined between the body portion and the block portion.

4. The electronic device of claim 3, wherein the body portion comprises a first side wall and at least one positioning protrusion; the first side wall faces the block portion; the at least one positioning protrusion is coupled to the first side wall.

5. The electronic device of claim 3, wherein the body portion comprises a first side wall facing the block portion; the block portion comprises a second side wall and at least one limiting protrusion; the second side wall faces the first side wall; and the at least one limiting protrusion is coupled to the second side wall.

6. The electronic device of claim 5, wherein the first side wall defines at least one indentation and each of the at least one limiting protrusion is opposite to a corresponding indentation.

7. The electronic device as claimed in claim 5, wherein the holder further comprises a supporting portion, the supporting portion is disposed between the body portion and the block portion; the body portion, the supporting portion and the block portion cooperatively define the holding groove; the limiting protrusion is disposed on a side of the second side wall away from the supporting portion; the limiting protrusion is spaced from the supporting portion.

8. The electronic device as claimed in claim 1, wherein the holder comprises a holding portion and an elastic arm coupled to the holding portion; the first segment is sandwiched between the elastic arm and the holding portion.

9. The electronic device as claimed in claim 1, wherein a depth of the sliding groove is greater than a depth of the depression.

10. The electronic device as claimed in claim 1, wherein the second electronic component comprises any combination of a receiver module, a camera module, a sensor module, a fingerprint module, and a display module.

11. An electronic device, comprising:
a first electronic component;
a second electronic component slidably coupled to the first electronic component;
a holder coupled to the second electronic component and being inserted into the first electronic component;
an antenna assembly, comprising:
a radio frequency (RF) module disposed in the first electronic component;
an antenna radiator disposed in the second electronic component, and
an RF cable; wherein an end of the RF cable is coupled to the antenna radiator and held by the holder, and another end of the RF cable is coupled to the radio frequency module; the RF cable is retracted and stretched when the holder is driven to slide by sliding the second electronic component; and
a mounting member disposed in the first electronic component; the mounting member defines a depression; the second segment is movably disposed in the depression; the second segment is driven to move in the depression when the first segment moves.

12. The electronic device as claimed in claim 11, wherein the holder defines a holding groove; and the first segment is disposed in the holding groove.

13. The electronic device as claimed in claim 12, wherein the holder comprises a body portion and a block portion, the body portion is spaced apart from the block portion; the holding groove is defined between the body portion and the block portion.

14. The electronic device of claim 13, wherein the body portion comprises a first side wall and at least one positioning protrusion; the first side wall faces the block portion; the at least one positioning protrusion is coupled to the first side wall.

15. The electronic device of claim 13, wherein the body portion comprises a first side wall facing the block portion; the block portion comprises a second side wall and at least one limiting protrusion; the second side wall faces the first side wall; and the at least one limiting protrusion is coupled to the second side wall.

16. The electronic device of claim 15, wherein the first side wall defines at least one indentation and each of the at least one limiting protrusion is opposite to a corresponding indentation.

17. The electronic device as claimed in claim 15, wherein the holder further comprises a supporting portion, the supporting portion is disposed between the body portion and the block portion; the body portion, the supporting portion and the block portion cooperatively define the holding groove; the limiting protrusion is disposed on a side of the second side wall away from the supporting portion; the limiting protrusion is spaced from the supporting portion.

18. The electronic device as claimed in claim 11, wherein the holder comprises a holding portion and an elastic arm coupled to the holding portion; the first segment is sandwiched between the elastic arm and the holding portion.

19. The electronic device as claimed in claim 11, wherein the second electronic component comprises any combination of a receiver module, a camera module, a sensor module, a fingerprint module, and a display module.

20. An electronic device, comprising:
a first electronic component;
a second electronic component slidably coupled to the first electronic component;
an antenna assembly, comprising:
a radio frequency (RF) module disposed in the first electronic component;
an antenna radiator disposed in the second electronic component, and
an RF cable disposed between and coupled to the radio frequency module and the antenna radiator; the radio frequency cable having a first segment and a second segment integrally extending from the first segment; the first segment being coupled to the antenna radiator; the second segment being coupled to the radio frequency module; and
a holder coupled to the second electronic component, the holder slidably extending into the first electronic component by moving the second electronic component; wherein the first segment is held by the holder, and the RF cable is driven to move by the holder; wherein the holder defines a holding groove; the first segment is disposed in the holding groove.

* * * * *